US010040986B2

(12) United States Patent
Pandey et al.

(10) Patent No.: US 10,040,986 B2
(45) Date of Patent: Aug. 7, 2018

(54) METHODS OF CEMENTING AND SPENT CRACKING CATALYST-CONTAINING CEMENT

(71) Applicant: Halliburton Energy Services, Inc., Houston, TX (US)

(72) Inventors: Vandana Neeraj Pandey, Maharashtra (IN); Rahul Chandrakant Patil, Maharashtra (IN); Remitha Anandoth Koyitti, Kerala (IN)

(73) Assignee: Halliburton Energy Services, Inc., Houston, TX (US)

( * ) Notice: Subject to any disclaimer, the term of this patent is extended or adjusted under 35 U.S.C. 154(b) by 183 days.

(21) Appl. No.: 14/904,865

(22) PCT Filed: Aug. 5, 2013

(86) PCT No.: PCT/US2013/053548
§ 371 (c)(1),
(2) Date: Jan. 13, 2016

(87) PCT Pub. No.: WO2015/020623
PCT Pub. Date: Feb. 12, 2015

(65) Prior Publication Data
US 2016/0168445 A1   Jun. 16, 2016

(51) Int. Cl.
| *C09K 8/467* | (2006.01) |
| *C04B 28/02* | (2006.01) |
| *C04B 28/04* | (2006.01) |
| *E21B 33/14* | (2006.01) |

(52) U.S. Cl.
CPC ............. *C09K 8/467* (2013.01); *C04B 28/02* (2013.01); *C04B 28/04* (2013.01); *E21B 33/14* (2013.01); *Y02W 30/91* (2015.05)

(58) Field of Classification Search
CPC .......... C09K 8/46; C09K 8/467; C04B 28/02; C04B 28/04; E21B 33/14
See application file for complete search history.

(56) References Cited

U.S. PATENT DOCUMENTS

| 3,052,628 | A | * | 9/1962 | Stanberry, Jr. ........... C09K 8/64 507/135 |
| 4,231,801 | A | * | 11/1980 | Dunton ............... C04B 18/0481 106/714 |
| 5,096,498 | A | | 3/1992 | Lowe |
| 7,441,600 | B2 | | 10/2008 | Brothers et al. |
| 8,029,618 | B2 | | 10/2011 | Al-Shafei |

FOREIGN PATENT DOCUMENTS

JP    2004-331415 A    11/2004

OTHER PUBLICATIONS

Patent Examination Report No. 1 issued for Australian Patent Application No. 2013397582 dated May 20, 2016, 5 pages.
Allahverdi et al., "Effects of RFCC Spent Catalyst on Some Physicomechanical Properties of Portland Cement Paste." Ceramics-Silikaty, 2011, vol. 55, No. 2, pp. 161-168.
Pacewska et al., "Hydration of Cement Slurry in the Presence of Spent Cracking Catalyst." Journal of Thermal Analysis and Calorimetry, 2000, vol. 60, No. 2, pp. 71-78.
International Search Report and Written Opinion for PCT/US2013/053548, prepared by ISA/KR, dated May 1, 2014.
Bour et al., New Expansive Cement System For High Temperature, Southwestern Petroleum Short Course, 1988, pp. 1-9.
Carter et al., Expanding Cements for Primary Cementing, Journal of Petroleum Technology, 1966, pp. 551-558, vol. 18, No. 5.
Seidel et al., Use of Expanding Cement Improver Bonding and Aids in Eliminating Annular Gas Migration in Hobbs Grayburg San Andres Wells, Jan. 1, 1985, InSPE Annual Technical Conference and Exhibition, Society of Petroleum Engineers, 8 pages.

* cited by examiner

*Primary Examiner* — Zakiya W Bates
*Assistant Examiner* — Crystal J Miller
(74) *Attorney, Agent, or Firm* — Haynes and Boone, LLP

(57) ABSTRACT

A cement composition and method for well treatment employing the cement composition that is effective at achieving zonal isolation, controlling gas migration, preventing corrosive conditions and sustaining wellbore integrity during drilling or construction of boreholes in such subterranean formations. The cement composition includes spent cracking catalyst from oil cracking processes.

18 Claims, No Drawings

METHODS OF CEMENTING AND SPENT CRACKING CATALYST-CONTAINING CEMENT

FIELD OF THE INVENTION

The present embodiments generally relate to subterranean cementing operations and, more particularly, to methods and compositions for achieving zonal isolation, controlling gas migration, preventing corrosive conditions and sustaining wellbore integrity during drilling or construction of boreholes in such subterranean formations.

BACKGROUND

The following paragraphs contain some discussion, which is illuminated by the innovations disclosed in this application, and any discussion of actual or proposed or possible approaches in this Background section does not imply that those approaches are prior art.

Natural resources such as oil and gas residing in a subterranean formation or zone are usually recovered by forming a wellbore that extends into the formation. The wellbore is drilled while circulating a drilling fluid therein. The drilling fluid is usually circulated downwardly through the interior of a drill pipe and upwardly through the annulus, which is located between the exterior of the pipe and the walls of the wellbore. After terminating the circulation of the drilling fluid, a string of pipe, e.g., casing, is run in the wellbore.

Cementing is a common technique used in wellbore operations to isolate or secure particular areas of a wellbore from other areas of a wellbore (zonal isolation). This type of cementing is typically performed by pumping a cement slurry into the annulus between the outside surface of a pipe string and the inside formation surface or wall of a wellbore and allowing the cement to set into a hard mass (i.e., sheath). Cement slurries typically contain cement, water, and various additives that can be tailored based on the type of cementing operation desired. The cement sheath attaches the string of pipe to the walls of the wellbore and seals the annulus, allowing a wellbore to be selectively completed.

However, cement can sometimes experience shrinkage that creates gaps between the cement and casing, resulting in loss of zonal isolation. Expansion additives are often added to the cement slurry in order to promote bonding integrity between the cement and the casing. Good bonding between the cement and the casing helps in achieving zonal isolation, controlling gas migration, protecting the casing from corrosive conditions and sustaining wellbore integrity. Poor bonding can limit production from the well and reduce the effectiveness of any stimulation treatments.

A large variety of materials have been used or proposed as cement expansion additives. For instance, common cement expansion additives include calcium sulfate hemihydrate, sodium sulfate and magnesium oxide. Generally, such materials provide cement expansion, however, such expansion is gained at the expense of either impaired compressive strength development or increased slurry viscosity. Furthermore, the growth of the petroleum industry has created a need for the recycling of many of the byproducts of petroleum processes. Therefore, it would be advantageous to use a petroleum process by-product as an expansion additive that provides adequate expansion, while simultaneously not affecting other desirable cement properties.

DETAILED DESCRIPTION

It is to be understood that the following disclosure provides many different embodiments, or examples, of the present invention for implementing different features of various embodiments of the present invention. Specific examples of components are described below to simplify and exemplify the present disclosure. These are, of course, merely examples and are not intended to be limiting.

According to certain embodiments of the present invention, a cement composition is provided that includes cement, water, and an expansion additive.

According to certain embodiments, the cement composition includes a hydraulic cement. According to certain embodiments, a variety of hydraulic cements may be utilized, including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, and combinations thereof. In certain embodiments, the hydraulic cement may comprise a Portland cement. In some embodiments, the Portland cements that are suitable for use are classified as Classes A, C, H, and G cements according to the American Petroleum Institute, API Specification for Materials and Testing for Well Cements, API Specification 10, Fifth Ed., Jul. 1, 1990.

According to certain embodiments, the cement composition includes water. The water may be fresh water, brackish water, saltwater, or any combination thereof. The cement composition may further include a water-soluble salt. Suitable water-soluble salts include sodium chloride, calcium chloride, calcium bromide, potassium chloride, potassium bromide, magnesium chloride, and combinations thereof. According to certain embodiments, the cement composition includes a water-soluble salt in an amount of from about 1% to about 36% by weight of the water (bwow). According to certain embodiments, the cement composition includes calcium chloride in an amount of from about 0.5% to about 5.0% by weight of the water (bwow).

According to certain embodiments, the expansion additive includes spent catalyst derived from oil refinery cracking processes. In oil refinery cracking, complex organic molecules such as heavy hydrocarbons are broken down into simpler molecules by the breaking of carbon-carbon bonds in the precursors. The rate of cracking and the end products are strongly dependent on the presence and type of catalysts employed. Once a catalyst has been fully utilized in the cracking process, it is described as being "spent." Typical catalysts employed in oil refinery cracking include silica-alumina catalysts. According to certain embodiments, the expansion additive includes spent silica-alumina cracking catalyst.

In certain embodiments, the spent cracking catalyst includes active alumina, silica, phosphorous pentoxide, sulfur trioxide, calcium oxide, iron oxide, cobalt oxide, nickel oxide, molybdenum oxide, and combinations thereof. Generally, the spent cracking catalyst can be added to the cement composition in any desired concentration. According to certain embodiments, the cement composition includes spent cracking catalyst in an amount of from about 1% to about 20% by weight of cement (bwoc). In certain embodiments, the spent cracking catalyst is passed through at least a 325 mesh size sieve before use.

According to certain embodiments, the spent cracking catalyst has an aluminum oxide content of from about 65% to about 95% by weight. According to certain embodiments, the spent cracking catalyst has a silicon dioxide content of from about 1% to about 15% by weight. According to certain embodiments, the spent cracking catalyst has a diphosphorous pentoxide content of from about 1% to about 10% by weight. According to certain embodiments, the spent cracking catalyst has a sulfur trioxide content of from about 1% to about 5% by weight. According to certain embodiments, the spent cracking catalyst has a calcium oxide content of from about 0.1% to about 1.0% by weight. According to certain embodiments, the spent cracking catalyst has an iron (III) oxide content of from about 2% to about 5% by weight. According to certain embodiments, the spent cracking catalyst has a cobalt oxide content of from about 0.5% to about 1.0% by weight. According to certain embodiments, the spent cracking catalyst has a nickel oxide content of from about 1% to about 3% by weight. According to certain embodiments, the spent cracking catalyst has a molybdenum oxide content of from about 5% to about 30% by weight.

According to certain embodiments, the cement composition which includes spent cracking catalyst has a percent expansion of from about 0.1% to about 10% when cured at a temperature of from about 100° F. to about 190° F. and at a pressure of from atmospheric pressure up to about 3000 psi.

According to certain embodiments, the cement composition which includes spent cracking catalyst has increased rheology but the slurry remains pourable and pumpable, and the compressive strength of the cement composition is not impaired in any way.

According to certain embodiments, the spent cracking catalyst expansion additive accelerates the thickening of the cement slurry. In certain embodiments, the cement composition which includes spent cracking catalyst attains a consistency of about 70 Bc (Bearden units of consistency) after setting for about 1 hour to about 2 hours.

According to certain embodiments, the spent cracking catalyst expansion additive has pozzolanic activity. Pozzolanic activity is a measure of the degree of reaction over time between calcium ions (or calcium hydroxide) in the presence of water. Pozzolanic activity of a composition is considered one of the parameters governing long term performance of the compressive strength of cement.

In certain other embodiments, the cement composition may further include a fluid loss additive. According to certain embodiments, the cement composition includes a fluid loss additive in an amount of from about 0.3% to about 2.0% by weight of cement (bwoc). A suitable fluid loss additive is hydroxyethyl cellulose.

In certain other embodiments, the cement composition may further include an accelerator. According to certain embodiments, the cement composition includes an accelerator in an amount of from about 1.0% to about 5.0% by weight of cement (bwoc). A suitable accelerator is calcium chloride.

In certain other embodiments, the cement composition may further include a dispersant. According to certain embodiments, the cement composition includes a dispersant in an amount of from about 0.1% to about 1.0% by weight of cement (bwoc). Suitable dispersants include polycarboxylate ether and formaldehyde sodium naphthalene sulfonate condensate.

In certain embodiments, a method for setting cement in order to reduce contraction of the cement is provided. According to certain embodiments, the method comprises first mixing water, cement and a cement expansion additive in order to form a cement slurry. In certain embodiments, a fluid loss additive can also be included in the cement slurry. The water to cement ratio can be determined based on the need for the cementing operation. One of ordinary skill in the art can determine the ratio of water to cement needed for a particular operation. According to certain embodiments, the cement expansion additive is the spent cracking catalyst composition described above.

According to certain embodiments, the cement slurry is pumped or injected into the desired place and allowed to expand and harden.

The following examples are illustrative of the compositions and methods discussed above.

Examples

Cement Slurry Preparation

Spent cracking catalyst was obtained from RKG International Pvt Ltd. and was analyzed for oxide content by X-Ray Fluorescence. The spent cracking catalyst had an oxide content as shown in Table 1 below:

TABLE 1

Spent Cracking Catalyst Oxide Composition

| Element as Oxides | Spent cracking catalyst (%) |
|---|---|
| $Al_2O_3$ | 71.31 |
| $SiO_2$ | 6.02 |
| $P_2O_5$ | 4.06 |
| $SO_3$ | 1.14 |
| CaO | 0.29 |
| $Fe_2O_3$ | 3.51 |
| $Co_3O_4$ | 0.80 |
| NiO | 1.40 |
| $MoO_3$ | 11.48 |
| TOTAL | 100 |

A cement slurry containing the spent cracking catalyst was prepared by mixing 152.21 g of water, 300.0 g of Class G cement, 30.0 g of the spent cracking catalyst, 3.0 g of $CaCl_2$, and 1.8 g of Halad®-322. Halad®-322 is a fluid loss additive that includes hydroxyethyl cellulose and is commercially available from Halliburton Energy Services.

A control cement slurry containing Microbond, instead of the spent cracking catalyst, was prepared by mixing 149.23 g of water, 300 g of Class G cement, 30.0 g of Microbond, 3.0 g of $CaCl_2$, and 1.8 g of Halad®-322. Microbond is a gypsum blend and is commercially available from Halliburton Energy Services.

Expansion Testing

The expansion effect of the spent cracking catalyst and other cement additives was tested by pouring cement slurries into a ring expansion mold and measuring the amount of expansion exerted on the ring by each cement slurry as they set.

Five cement slurries, four with different expansion additives and one without an expansion additive, were prepared and poured into a ring expansion mold. The slurries included the ingredients indicated in Table 2 below.

TABLE 2

CEMENT SLURRY COMPOSITIONS

| Slurry | Water (g) | Class G Cement (g) | Expansion additive (g) | CaCl$_2$ (g) | Halad ®-322 |
|---|---|---|---|---|---|
| No expansion additive | 150.78 | 300.0 | 0.0 | 3.0 | 1.8 |
| Fresh catalyst (pure alumina) | 150.50 | 300.0 | 30.0 | 3.0 | 1.8 |
| Molybdenum oxide | 162.30 | 300.0 | 30.0 | 3.0 | 1.8 |
| Microbond | 149.23 | 300.0 | 30.0 | 3.0 | 1.8 |
| Spent cracking catalyst | 152.21 | 300.0 | 30.0 | 3.0 | 1.8 |

Percent Expansion at 100° F. and Atmospheric Pressure

The cement slurries set forth in Table 2 were prepared and poured into ring expansion molds and were then allowed to cure for 7 days at 100° F. and atmospheric pressure. After 7 days, the percent expansion of the ring expansion mold was measured. All experiments were run three times. Table 3 summarizes the results of these expansion tests.

TABLE 3

Expansion at 100° F., atmospheric pressure

| Expansion Additive | Curing time (Days) | % Expansion 1 | 2 | 3 | Average Expansion (%) |
|---|---|---|---|---|---|
| No expansion additive | 7 | 0.18 | 0.16 | 0.18 | 0.17 |
| Fresh catalyst | 7 | 0.35 | 0.31 | 0.35 | 0.34 |
| Molybdenum oxide | 7 | 0.23 | 0.24 | 0.24 | 0.24 |
| Microbond | 7 | 0.42 | 0.42 | 0.44 | 0.43 |
| Spent cracking catalyst | 7 | 0.60 | 0.62 | 0.62 | 0.61 |

The cement composition prepared with the spent cracking catalyst had an average expansion of 0.61%. In contrast, the cement composition that did not include an expansion additive had an average expansion of 0.17%. Also in contrast, the cement compositions prepared with fresh catalyst, molybdenum oxide and Microbond had average expansions of only 0.34%, 0.24% and 0.43%, respectively, at the same temperature and pressure. These results show that a cement composition that includes the spent cracking catalyst provides greater expansion at 100° F. and atmospheric pressure than a cement composition with no cement expansion additive and cement compositions with that include fresh catalyst, molybdenum oxide and Microbond. These results demonstrate that it is the spent cracking catalyst and the blend of oxides included in the spent cracking catalyst that is contributing to the expansion of the cement.

Percent Expansion at 100° F. and 3000 Psi

The cement slurries set forth in Table 2 that included the spent cracking catalyst and Microbond expansion additives, were prepared and poured into ring expansion molds and were then allowed to cure for 7 days at 100° F. and 3000 psi. After 7 days, the percent expansion of the ring expansion mold was measured. All experiments were run three times. Table 4 summarizes the results of these expansion tests.

TABLE 4

Expansion at 100° F., 3000 psi

| Expansion Additive | Curing time (Days) | % Expansion 1 | 2 | 3 | Average Expansion (%) |
|---|---|---|---|---|---|
| Microbond | 7 | 0.69 | 0.66 | 0.66 | 0.67 |
| Spent cracking catalyst | 7 | 0.76 | 0.79 | 0.79 | 0.78 |

The cement composition prepared with the spent cracking catalyst had an average expansion of 0.78%. In contrast, the cement composition prepared with Microbond had an average expansion of only 0.67% at the same temperature and pressure. This result shows that a cement composition that includes the spent cracking catalyst provides greater expansion at 100° F. and 3000 psi compared to a cement composition that includes Microbond.

Percent Expansion at 190° F. and 3000 Psi

The cement slurries set forth in Table 2 that included the spent cracking catalyst and Microbond expansion additives, were prepared and poured into ring expansion molds and were then allowed to cure for 7 days at 190° F. and 3000 psi. After 7 days, the percent expansion of the ring expansion mold was measured. All experiments were run three times. Table 5 summarizes the results of these expansion tests.

TABLE 5

Expansion at 190° F., 3000 psi

| Expansion Additive | Curing time (Days) | % Expansion 1 | 2 | 3 | Average Expansion (%) |
|---|---|---|---|---|---|
| Microbond | 7 | 0.79 | 0.77 | 0.79 | 0.78 |
| Spent cracking catalyst | 7 | 1.08 | 1.08 | 1.08 | 1.08 |

The cement composition prepared with the spent cracking catalyst had an average expansion of 1.08% at 190° F. and 3000 psi. In contrast, the cement composition prepared with Microbond had an average expansion of only 0.78% at the same temperature and pressure. This result shows that a cement composition that includes the spent cracking catalyst provides greater expansion at 190° F. and 3000 psi compared to a cement composition that includes Microbond.

Thickening Test

The thickening of cement slurries was tested by measuring the time it took for the cement slurries to reach 70 Bc (Bearden units of consistency).

The cement slurries set forth in Table 2 that included the spent cracking catalyst and Microbond expansion additives, were prepared and were monitored with a Fann HPHT consistometer Model 290 and the time it took for the cement slurries to reach 70 Bc was measured. Table 6 summarizes the results of the thickening tests.

TABLE 6

Thickening time at 100° F., 2600 psi

| Expansion Additive | Time (hr:min) | Bc |
|---|---|---|
| Microbond | 2:47 | 70 |
| Spent Cracking Catalyst | 1:49 | 70 |

The cement composition prepared with the spent cracking catalyst as the cement expansion additive took 1 hour and 49 minutes to reach 70 Bc, compared to a cement composition prepared with Microbond as the cement expansion additive which took 2 hours and 47 minutes to reach 70 Bc. This result shows that a cement composition that includes the spent cracking catalyst expansion additive has a much shorter thickening time to reach 70 Bc at 100° F. and 2600 psi compared to a cement composition that includes Microbond, a conventional cement expansion additive.

Compressive Strength Testing

Wellbore cement compositions develop and maintain compressive strength to withstand typical conditions experienced in a wellbore. The compressive strength of a cement composition is determined with a UCA (Ultrasonic Cement Analyzer) which determines how the compressive strength of the cement develops over time during curing (or setting). The compressive strength of a cement is determined by measuring the change in velocity of an ultrasonic signal transmitted through the cement sample as it hardens. As the compressive strength of the cement increases, the transmit time of the signal through the sample decreases. The UCA can then convert the signal transmit time into a compressive strength (psi) measurement.

The cement slurries set forth in Table 2 that included the spent cracking catalyst and Microbond expansion additives, were prepared and were tested for the time it took them to reach a compressive strength of 50 psi, and again for their compressive strength at 24 hours using a UCA device. In typical oilfield processes, cement compositions need to develop a compressive strength of at least 50 psi before commencing further drilling of a well. Therefore, the shorter the time it takes for a cement composition to reach a compressive strength of 50 psi, the more desirable that cement composition is for use in oilfield processes. Table 7 summarizes the results of the compressive strength testing.

TABLE 7

Compressive strength at 100° F., 3000 psi

| Expansion Additive | Compressive strength (psi) | Time (hr:min) |
|---|---|---|
| Microbond | 50 | 5:01 |
|  | 2780 | 24:00 |
| Spent cracking catalyst | 50 | 3:37 |
|  | 2183 | 24:00 |

The cement composition prepared with the spent cracking catalyst expansion additive reached a compressive strength of 50 psi in 3 hours and 37 minutes, compared to the cement composition prepared with the Microbond expansion additive which reached a compressive strength of 50 psi in 5 hours and 1 minute. Additionally, the cement composition prepared with the spent cracking catalyst reached a compressive strength of 2183 psi after 24 hours, compared to the cement composition prepared with Microbond which reached a compressive strength of 2780 psi after 24 hours. Therefore, these results show that utilizing the spent cracking catalyst as a cement expansion additive does not impair, and in face enhances, early compressive strength development of the cement composition compared to a cement composition that includes the conventional Microbond expansion additive. Also, these results show that utilizing the spent cracking catalyst as a cement expansion additive does not prevent a cement composition from attaining an acceptable compressive strength at 24 hours after cure.

Rheology Test

Two samples of the cement slurries set forth in Table 2 that included the spent cracking catalyst and Microbond expansion additives, were prepared and were analyzed using a Fann 35 rheometer with bob and sleeve arrangement, and the dial readings, which are related to viscosity, at various RPMs were recorded. The results of the rheology tests are shown in table 8 below.

TABLE 8

Rheology Test

| RPM | Microbond Sample 1 | Microbond Sample 2 | Spent cracking catalyst Sample 1 | Spent cracking catalyst Sample 2 |
|---|---|---|---|---|
| 3 | 1 | 1 | 12 | 18 |
| 6 | 2 | 2 | 15 | 18 |
| 30 | 6 | 7 | 17 | 19 |
| 60 | 10 | 12 | 22 | 24 |
| 100 | 15 | 17 | 28 | 32 |
| 200 | 29 | 32 | 45 | 48 |
| 300 | 44 | 44 | 66 | 66 |
| 600 |  | 85 |  | 112 |

The results in Table 8 show that that cement slurries prepared with the spent cracking catalyst have comparable viscosities to those prepared with Microbond. Furthermore, the results in Table 8 are within the range that demonstrates that cement slurries prepared with the spent cracking catalyst are pourable and can be pumped easily.

While the present invention has been described in terms of certain embodiments, those skilled in the art will recognize that the invention can be practiced with modification within the spirit and scope of the appended claims.

The present disclosure has been described relative to certain embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A cement composition comprising:
cement;
water; and
spent cracking catalyst derived from oil refinery cracking, wherein the spent cracking catalyst comprises alumina, silica, phosphorous pentoxide, sulfur trioxide, calcium oxide, iron oxide, cobalt oxide, nickel oxide, and molybdenum oxide, and is present in an amount of from about 1% to about 20% by weight of the cement.

2. The cement composition according to claim 1, wherein the cement is selected from Portland cements, gypsum cements, high alumina content cements, slag cements, high magnesia content cements, and combinations thereof.

3. The cement composition according to claim 1, wherein the water is selected from fresh water, brackish water, saltwater, and any combination thereof.

4. The cement composition of claim 1, wherein the spent cracking catalyst comprises:
from about 65% to about 95% by weight of aluminum oxide;
from about 1% to about 15% of silicon dioxide;
from about 1% to about 10% of diphosphorus pentoxide;
from about 1% to about 5% of sulfur trioxide;
from about 0.1% to about 1.0% of calcium oxide;

from about 2% to about 5% of iron (III) oxide;
from about 0.5% to about 1.0% of cobalt oxide;
from about 1% to about 3% of nickel oxide; and
from about 5% to about 30% of molybdenum oxide.

5. The cement composition of claim 1, wherein when cured for a period of from three to four hours, the composition reaches a compressive strength of at least 50 psi.

6. The cement composition of claim 1, further comprising from about 1% to about 36% by weight of the water of a water-soluble salt, wherein the water-soluble salt is selected from sodium chloride, calcium chloride, calcium bromide, potassium chloride, potassium bromide and magnesium chloride.

7. The cement composition of claim 1, wherein the cement composition comprises from about 0.5% to about 5% by weight of the water of a water soluble salt calcium chloride.

8. The cement composition of claim 7, further comprising a fluid loss additive.

9. A cement composition comprising:
   cement;
   water; and
   spent cracking catalyst derived from oil refinery cracking, the spent cracking catalyst present in an amount of from about 1% to about 20% by weight of the cement;
   wherein a volume of the cement composition expands by a factor of from about 0.01 to 10% when cured at between 80° F. to 200° F. and between 14.7 psi to 3000 psi.

10. A method of cementing in a subterranean formation comprising:
   introducing a cement composition having a first volume into the subterranean formation, wherein the cement composition comprises:
   cement;
   water; and
   an additive, wherein the additive comprises a spent cracking catalyst composition derived from oil refinery cracking;
   allowing the cement composition to set, wherein the cement composition has a second volume; and
   wherein the second volume of the cement composition is larger than the first volume of the cement composition by a factor of 0.01 to 10%; and
   wherein the spent cracking catalyst comprises alumina, silica, phosphorous pentoxide, sulfur trioxide, calcium oxide, iron oxide, cobalt oxide, nickel oxide, and molybdenum oxide.

11. The method according to claim 10, wherein the cement is selected from Portland cements, gypsum cements, high alumina content cements, slag cements, high magnesia content cements, and combinations thereof.

12. The method according to claim 10, wherein the water is selected from fresh water, brackish water, saltwater, and any combination thereof.

13. The method according to claim 10, wherein the spent cracking catalyst comprises:
   from about 65% to about 95% by weight of aluminum oxide;
   from about 1% to about 15% of silicon dioxide;
   from about 1% to about 10% of diphosphorus pentoxide;
   from about 1% to about 5% of sulfur trioxide;
   from about 0.1% to about 1.0% of calcium oxide;
   from about 2% to about 5% of iron (III) oxide;
   from about 0.5% to about 1.0% of cobalt oxide;
   from about 1% to about 3% of nickel oxide; and
   from about 5% to about 30% of molybdenum oxide.

14. The method according to claim 10, wherein the cement composition is cured at between 80° F. and 200° F. and between 14.7 psi to 3000 psi.

15. The method according to claim 10, wherein when the cement composition is cured for a period of from three to four hours, the cement composition reaches a compressive strength of at least 50 psi.

16. The method according to claim 10, wherein the cement composition further comprises from about 1% to about 36% by weight of the water of a water-soluble salt, wherein the water-soluble salt is selected from sodium chloride, calcium chloride, calcium bromide, potassium chloride, potassium bromide and magnesium chloride.

17. The method according to claim 10, wherein the cement composition comprises from about 0.5% to about 5% by weight of the water of calcium chloride.

18. The method according to claim 17, wherein the cement composition further comprises a fluid loss additive.

* * * * *